United States Patent
Philippe et al.

(10) Patent No.: US 7,999,502 B2
(45) Date of Patent: Aug. 16, 2011

(54) PUMPING SYSTEM

(75) Inventors: Laurent Marc Philippe, Voglans (FR); Anthony John Wilder, Hove (GB)

(73) Assignee: Edwards Limited, Crawley, West Sussex (GB)

( * ) Notice: Subject to any disclaimer, the term of this patent is extended or adjusted under 35 U.S.C. 154(b) by 1018 days.

(21) Appl. No.: 10/588,466

(22) PCT Filed: Jan. 27, 2005

(86) PCT No.: PCT/GB2005/000272
§ 371 (c)(1), (2), (4) Date: May 17, 2007

(87) PCT Pub. No.: WO2005/075827
PCT Pub. Date: Aug. 18, 2005

(65) Prior Publication Data
US 2008/0038118 A1    Feb. 14, 2008

(30) Foreign Application Priority Data
Feb. 3, 2004 (GB) .................................. 0402330.5

(51) Int. Cl.
*H02H 5/04* (2006.01)
(52) U.S. Cl. .................. 318/783; 318/400.21; 318/641; 318/469; 417/53; 417/212
(58) Field of Classification Search .................. 318/565, 318/623, 628, 641, 650, 644, 645, 400.22, 318/708, 727, 117, 783, 469, 476, 806; 417/1, 417/32, 237, 274, 278, 279, 324, 271, 44.1, 417/53, 212; 477/157, 177; 700/256
See application file for complete search history.

(56) References Cited

U.S. PATENT DOCUMENTS

| | | | | | |
|---|---|---|---|---|---|
| 4,330,828 | A | * | 5/1982 | Smith et al. | 701/102 |
| 4,476,423 | A | * | 10/1984 | Mallick et al. | 318/800 |
| 5,054,294 | A | * | 10/1991 | Dudley | 62/228.4 |
| 5,520,517 | A | * | 5/1996 | Sipin | 417/44.3 |

(Continued)

FOREIGN PATENT DOCUMENTS
DE    43 18 214 A1    12/1994
(Continued)

OTHER PUBLICATIONS

Friedow Michael, Luecke Hans-Ulrich; abstract of DE 19622754 A, "Control of Pump Motor for Motor Vehicle Anti-Lock Braking or Anti-Slip Control System—Involves Controlling Pump Motor So As to Give Certian Flow Against Given Back Pressure, Depending on Extenal Parameters Such as Voltage," Dec. 11, 1997; Bosch GmbH Robert.

Noda Hiroo, Kitamura Toshio, Hamada Kaoru; abstract of JP 57164242 A, "Engine Driven Type Room Airconditioner," Oct. 8, 1982; Kubota Tekko KK.

(Continued)

*Primary Examiner* — Bentsu Ro
*Assistant Examiner* — Antony M Paul

(57) ABSTRACT

The present invention provides a pumping system (60) comprising: a pumping mechanism (64); a motor (51) for driving the pumping mechanism; a drive control (50) for controlling the motor; and means (52) for monitoring at least one state within the system; wherein, to improve the performance of the system, the drive control causes the system to operate for transient periods in an overload condition which can result in said monitored state exceeding a predetermined operational limit, and when operating in said overload condition said drive control controls the power to the motor dependent on the level of said monitored state thereby avoiding said state from exceeding said operational limit.

17 Claims, 6 Drawing Sheets

U.S. PATENT DOCUMENTS

| | | | |
|---|---|---|---|
| 5,718,565 A | | 2/1998 | Kuhn et al. |
| 5,944,049 A | * | 8/1999 | Beyer et al. ............... 137/487.5 |
| 6,142,741 A | * | 11/2000 | Nishihata et al. .............. 417/32 |
| 6,215,682 B1 | * | 4/2001 | Akamatsu ..................... 363/141 |
| 6,244,825 B1 | * | 6/2001 | Sasaki et al. ............... 417/44.11 |
| 6,254,353 B1 | * | 7/2001 | Polo et al. .................. 417/44.11 |
| 6,414,455 B1 | * | 7/2002 | Watson .......................... 318/432 |
| 6,501,629 B1 | * | 12/2002 | Marriott ........................... 361/22 |
| 6,741,056 B1 | * | 5/2004 | Hall ............................... 318/599 |

FOREIGN PATENT DOCUMENTS

| | | |
|---|---|---|
| EP | 0 530 770 B1 | 3/1993 |
| EP | 1 213 482 A1 | 6/2002 |
| EP | 1 278 298 A2 | 1/2003 |
| WO | WO 99/04325 | 1/1999 |

OTHER PUBLICATIONS

United Kingdom Search Report for Application No. GB 0402330.5; Date of Mailing: May 26, 2004; Claims Searched: 1-19; Date of Search: May 25, 2004.

PCT Notification of Transmittal of the International Search Report and the Written Opinion of the International Searching Authority, or the Declaration of International Application No. PCT/GB2005/000272; Date of mailing: May 18, 2005.

PCT International Search Report of International Application No. PCT/GB2005/000272; Date of mailing of the International Search Report: May 18, 2005.

PCT Written Opinion of the International Searching Authority of International Application No. PCT/GB2005/000272; Date of mailing: May 18, 2005.

* cited by examiner

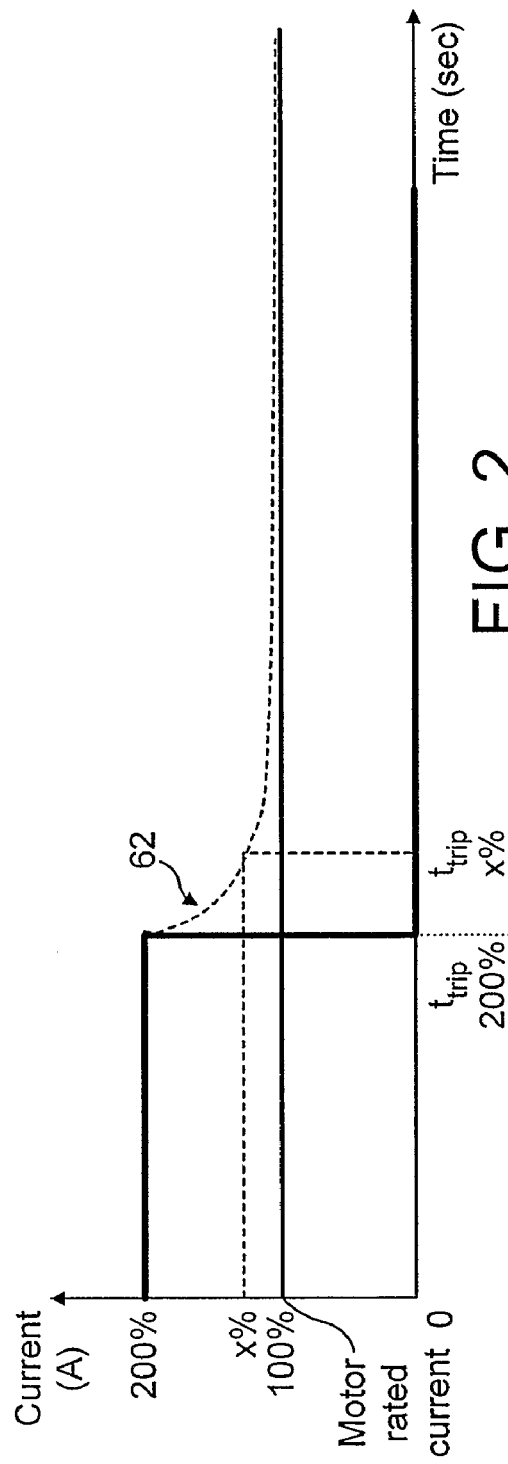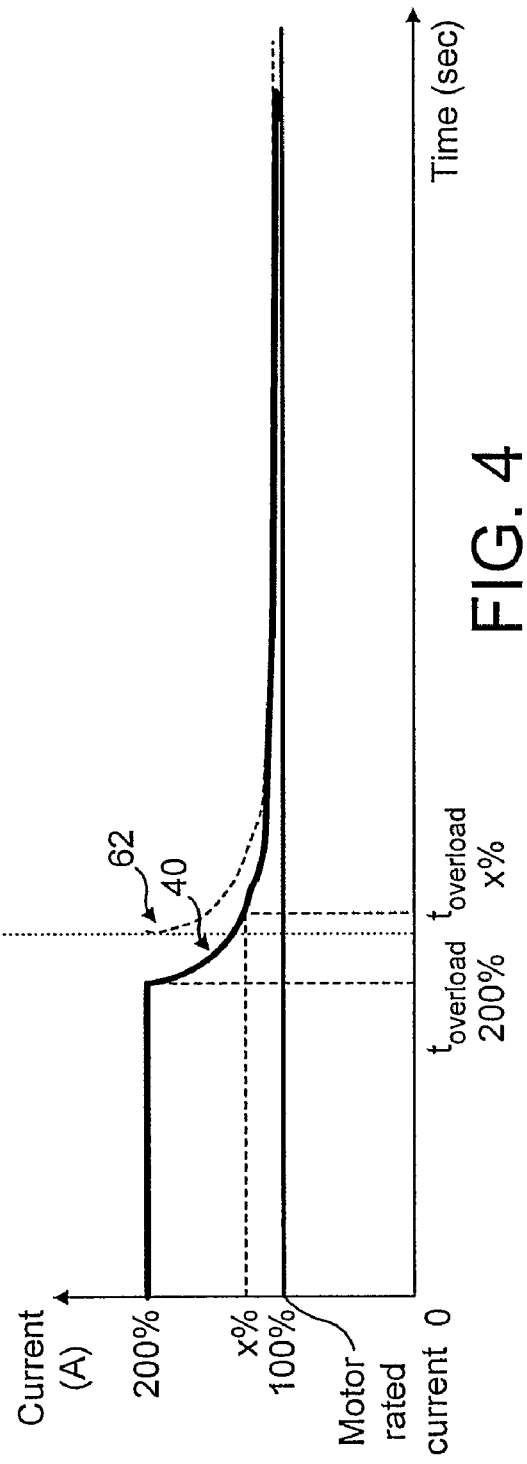

PUMPING SYSTEM

FIELD OF THE INVENTION

The present invention relates to pumping systems, or pumps, comprising: a pumping mechanism; a motor for driving the pumping mechanism; and a drive control for controlling the motor.

BACKGROUND OF THE INVENTION

Pumping systems, and particularly, systems comprising a vacuum pumping mechanism, are used extensively in semiconductor processing systems. A typical pumping system 60 is shown in FIG. 7. Processing of semiconductor wafers is performed in a vacuum, or processing, chamber 62. The pressure of process gas in the processing chamber during processing is maintained at relatively low processing pressures by a vacuum pump, or pumping mechanism, 64. The pressure is typically kept at processing pressures for extended periods and is allowed to return to atmospheric pressure periodically for repair and maintenance of equipment, for example. Unprocessed wafers are introduced to the processing chamber and processed wafers are withdrawn from the processing chamber via a load lock chamber. The pressure in the load lock chamber is controlled by a vacuum pump such that wafers can be transferred to and from the semiconductor processing system when the load lock chamber is at atmosphere, and wafers can be transferred between the load lock chamber and processing chamber or chambers when the load lock chamber has been evacuated to processing pressures. When choosing a vacuum pump for a chamber associated with a semiconductor processing system, the power requirement of the pump must be specified. A drive control 50, including a variable speed drive is chosen with an appropriate power requirement for controlling a motor 51 of the pump. Typically, the power requirement for a drive and a pump will be the same.

A vacuum pump is required, therefore, to be able (a) to reduce the pressure in a chamber to processing pressures and (b) to maintain processing pressure in a chamber. When a vacuum pump maintains processing pressures in a chamber, it is resisting atmospheric pressure from flowing into the chamber from downstream of the pump. This is termed operating at ultimate. Operating at ultimate is relatively less demanding on the pump's power requirements. Operation of the pump to evacuate a chamber from atmosphere to processing pressures (pump-down) requires relatively more power.

It is generally the procedure to select the power capacity of a vacuum pump, and also the drive, to meet the requirement at pump-down, even though pump-down may only take, for example, 2-3% of the vacuum pump's active life. The cost and size of the pump's drive increases with increased power requirement, even though increased power is required for only a small percentage of operation.

Referring to FIG. 1, a prior art drive control is shown which includes a variable speed drive 50 for controlling the power delivered to a motor 51. Drive 50 comprises a first module 52 for monitoring a motor thermal load (MTL) of the motor. As is known in the art, the motor current ($I_{motor}$) is input to the first module, which estimates motor thermal load. $I_{rated}$ is a rated current at which the motor can operate indefinitely without overheating. The first module calculates the square of $I_{motor}$ over $I_{rated}$ and uses a first order low-pass filter 52 (with a time constant $\tau$ and the Laplace operator s) to calculate motor thermal load. The motor can be thermally modelled using the first order system with its temperature being a function of the square of the input current.

The first order low pass filter represented in module 52 is digital, but alternatively, motor temperature could be modelled by analogue means. A higher order filter could be used for greater accuracy.

The second module 54 comprises a current control module 56 for transmitting electrical power to motor 51 as indicated by the arrows referenced electrical power to motor. The power is controlled by controlling the current supplied to the motor, which in turn is controlled by adjusting the frequency and/or amplitude of the voltage in the motor. A programmable internal drive current limit 58 outputs a drive current limit to control module 56 for limiting the power transmitted to the motor. A comparator 57 compares the motor thermal load MTL with a predetermined motor thermal load held in pre-set trip value store 60. If the determined motor thermal load exceeds the pre-set trip value, a trip command is transmitted to the control module 56 for cutting power to the motor. Tripping involves a sudden and immediate reduction of motor power to zero, the purpose of which is to protect the motor from damage.

In general, motors and drives can operate at 100% of their rated power indefinitely. However they can be overloaded to, typically, 200% (or more) of rated power for a short term time limited period.

FIG. 2 shows a graph of current ($I_{motor}$) against time for variable speed drive 50. Broken line 62 indicates when the motor thermal load exceeds the pre-set value and thus when tripping occurs. The broken line is plotted according to the relationship between current and motor thermal load. The rated power of a motor is the power at which the motor can be operated indefinitely without overheating and therefore without tripping. A motor operated at rated power, rated voltage and rated frequency, draws a rated current $I_{rated}$ referred to above in relation to FIG. 1.

FIG. 2 shows the rated current $I_{rated}$ as (100%), which is the current that can be sustained indefinitely without overheating the motor. As will be seen from FIG. 2, when drive control 50 is operated in an overload condition at a current of 200%, tripping of the motor occurs at a time $t_{trip}$ (200%) and operation in an overload condition at a current of X % leads to tripping of the motor at a time $t_{trip}$ (X %). It will be appreciated therefore that the time at which tripping occurs is dependent on the amount of the overload current (i.e. the extent to which the current exceeds the rated current).

It is possible, therefore to operate a motor in overload conditions to decrease, say, pump-down times of a vacuum pump in a semiconductor processing system. However, this has the disadvantage that the drive may trip if the overload is held too long or is too high. This is disadvantageous because if the motor is stopped, the semiconductor processing wafers may be damaged.

The present invention seeks to improve pumping system performance by deliberately operating the system for transient periods in an overload condition without any possibility of tripping.

SUMMARY OF THE INVENTION

In a first aspect, the present invention provides a pumping system comprising: a pumping mechanism; a motor for driving the pumping mechanism; a drive control for controlling the motor; and means for monitoring at least one state within the system; wherein, to improve the performance of the system, the drive control causes the system to operate for transient periods in an overload condition which can result in said monitored state exceeding a predetermined operational limit, and when operating in said overload condition said drive control controls the power to the motor dependent on the level of said monitored state thereby avoiding said state from exceeding said operational limit. The pumping mechanism may be a vacuum pumping mechanism.

The performance is preferably improved by said drive control increasing the power supplied to the motor to a level which can result in said monitored state exceeding a predetermined operational limit. The drive control preferably causes the system to operate in an overload condition when a load on the motor requires increased power supply to the motor.

Preferably, the drive control does not limit said power unless said state exceeds a predetermined lower limit. Above said predetermined lower limit, said drive control may gradually reduce or increase power dependent on said monitored state.

The drive control preferably includes gain circuitry which can adopt: a gain of 1 thereby not limiting motor power; a gain of zero thereby limiting motor power to zero; and any gain between one and zero, said gain circuitry controlling said gain according to a predetermined relationship with said state.

In the preferred embodiment, the drive control controls the power of the motor by limiting the current supplied to the motor by adjusting the frequency of the voltage and/or the amplitude of the voltage supplied to the motor. The drive control may comprise programmable means for setting a maximum allowable current in said motor thereby setting the extent to which the system can be overloaded.

Said state may be a temperature within the system. Said state may be a calculation of the thermal load of the motor or drive or any part of the pumping mechanism. In this case, the drive control may estimate the motor thermal load according to:

$$\left(\frac{I_{Motor}}{I_{Rated}}\right)^2 \times \frac{1}{1+s\tau}$$

where $I_{motor}$ is the current in the motor, $I_{rated}$ is a rated current above which said motor is operating in said overload condition, $\tau$ is a time constant, and s is the Laplace operator.

Alternatively, said monitored state within the system may be any one or more of: a pressure; a current; a voltage; an impedance, or a temperature. The drive control may comprise means for receiving input from one or more sensors for monitoring one or more said states within the system, and when the drive control causes the system to operate for transient periods in an overload condition the power to the motor is controlled to avoid said one or more states from exceeding the predetermined operational limit. For example, one or more sensors may be for sensing one or more of gas pressure, temperature, voltage, or impedance within the system.

The drive control may comprise a variable speed drive for controlling the power to the motor dependent on the level of said monitored state thereby avoiding said state from exceeding said operational limit.

The drive control may comprise analogue means for controlling the power to the motor dependent on the level of said monitored state thereby avoiding said state from exceeding said operational limit.

The drive control may be operable to prevent said system from operating in an overload condition.

In a second aspect, the present invention provides a method of controlling a pumping system comprising: a pumping mechanism; a motor for driving the pumping mechanism; and a drive control for controlling the power to the motor, wherein said method comprises improving the performance of the system by causing the system to operate for transient periods in an overload condition which can cause said monitored state to exceed a predetermined operational limit, and, when operating in said overload condition, controlling the power to the motor dependent on the level of said monitored state thereby avoiding said state from exceeding said operational limit.

Features described above in relation to system aspects of the invention are equally applicable to method aspects, and vice versa.

In order that the present invention be more readily understood, two embodiments thereof, which are given by way of example only, will now be described with reference to the accompanying drawings, in which:

BRIEF DESCRIPTION OF THE DRAWINGS

FIG. 2 shows a graph of current against time for the known drive control;

FIG. 4 shows a graph of current against time for the first embodiment;

DETAILED DESCRIPTION OF THE INVENTION

Figure 3:
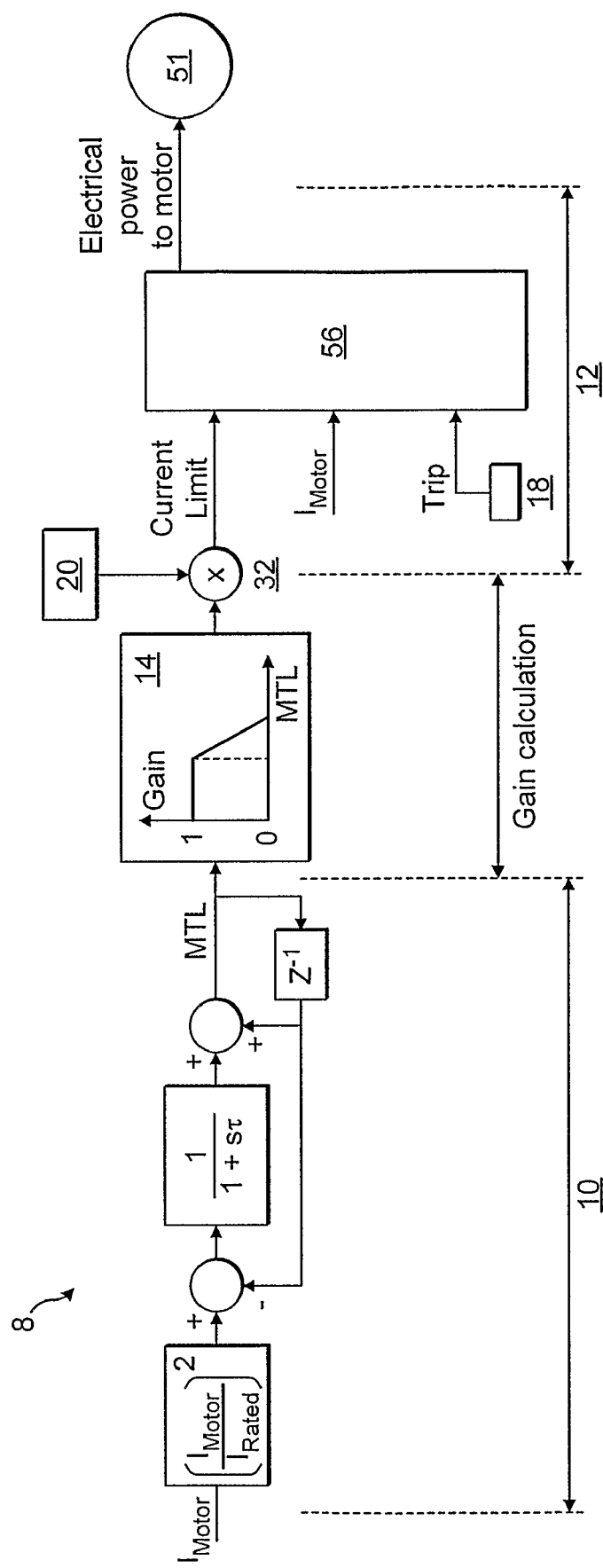
FIG. 3 shows a drive control according to a first embodiment of the invention.

FIG. 3 shows a drive control in the form of a variable speed drive 8 according to a first embodiment of the present invention. First and second modules 10 and 12 are similar to first and second modules 52 and 54 shown in FIG. 1. The first module 10 monitors motor thermal load MTL using the aforementioned relationship between $I_{motor}$, $I_{rated}$, $\tau$ and s. The motor thermal load is input to a gain circuitry unit 14. Unit 14 calculates a gain according to a predetermined relationship with motor thermal load, and outputs the gain to a multiplier 32, which also receives an input from a programmable internal drive current limit unit 20. The multiplier 32 outputs an adjusted current limit to current control module 16. The current limit output from the multiplier 32 limits the power of the motor 30.

Gain circuitry unit 14 determines the gain output to multiplier 32 according to a predetermined relationship with motor thermal load MTL. The relationship is embodied in an algorithm, one example of which is illustrated in FIG. 3a (described in further detail below).

FIG. 4 shows a graph of current against time for drive 8. Broken line 62 in FIG. 4 indicates when the motor thermal load exceeds the predetermined operational limit and thus when tripping would have occurred in the prior art to prevent damage to the motor (as shown in FIG. 2). Solid line 40 indicates the boundary of operation of the motor according to the present embodiment. Solid line 40 is spaced away from broken line 62 to provide a safety margin.

Gain circuitry unit 14 in drive control 8 limits the power supplied to the motor by reducing the current. The gain circuitry can adopt a gain of 1 which does not limit motor power; a gain of 0 to permit no power to be delivered to the motor; and a gain between 1 and 0 to adjust the power delivered to the motor between 'no limit' and 'no power'. Accordingly, the current supplied to the motor is controlled so that the motor thermal load does not exceed a predetermined operational limit (i.e. broken line 62 is not exceeded).

Figure 3A:
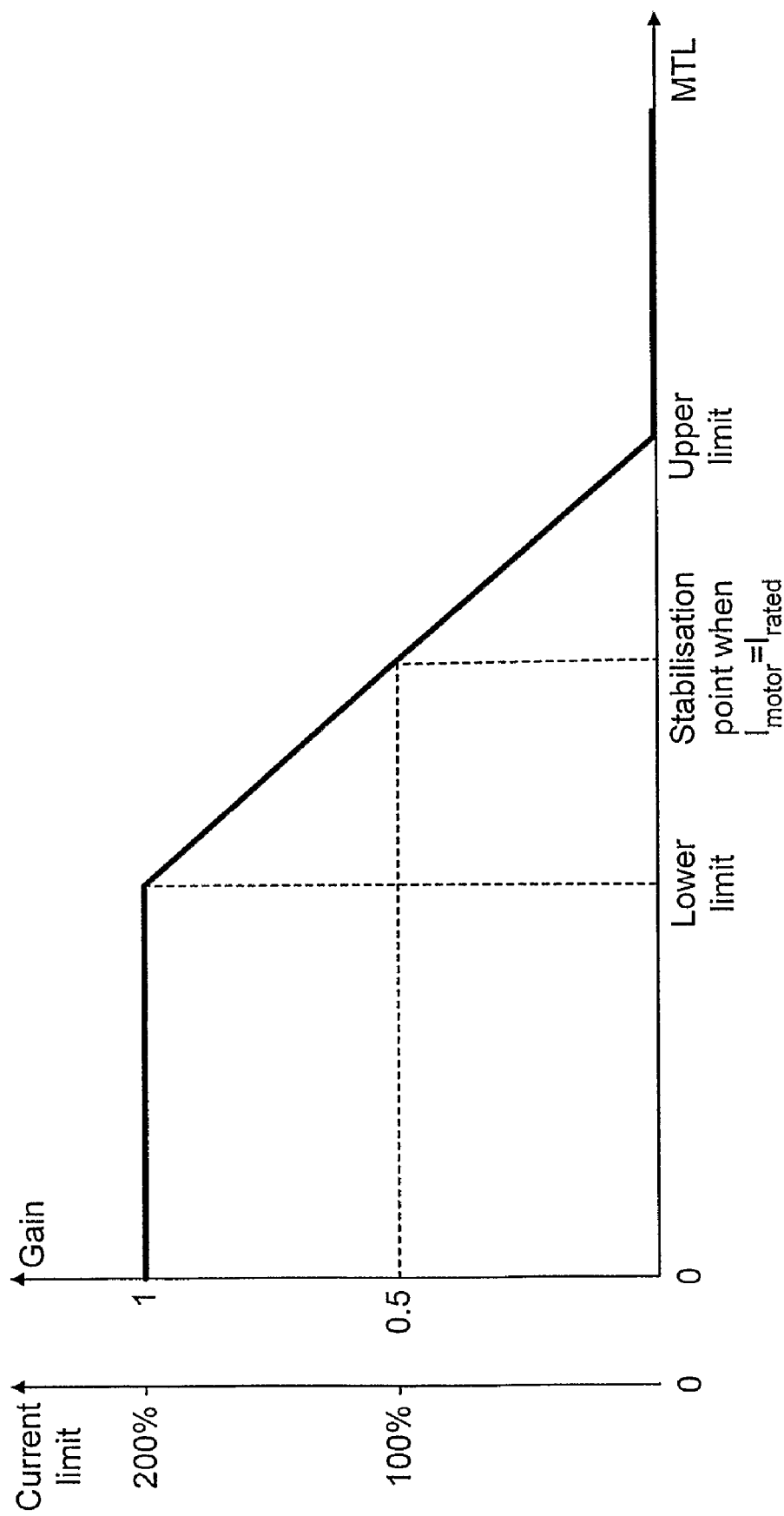
FIG. 3a is a graphical representation of a gain function shown in relation to motor current and motor thermal load.

As shown in FIG. 3a, the gain of unit 14 is 1 when motor thermal load is below a predetermined lower limit. Power supplied to the motor is not limited when the gain is 1. The safety margin between broken line 62 and solid line 40 in FIG. 4 is determined by the selected lower limit. Unit 14 gradually reduces the gain as the motor thermal load increases above the lower limit according to the relationship between motor thermal load and gain shown in FIG. 3a. In the example shown, the stabilisation point (when $I_{motor}=I_{rated}$) is reached at a gain of 0.5. The motor is not allowed to operate in an overload condition when the motor thermal load is above the stabilisation point. The gain is gradually reduced to zero when the motor thermal load reaches a predetermined upper limit. Accordingly, the drive control 8 can operate the motor for transient periods in an overload condition (when the motor thermal load is less than the stabilisation point) then reduce motor power to a sustainable value without tripping the motor.

As shown in FIG. 4, for example, if the load on the pump is relatively high (e.g. at pump-down in a semiconductor system), the drive 8 causes a current at 200% of the motor rated current to be delivered to the motor over a time $t_{overload(200\%)}$, thus benefiting from increased power and improved system performance. At time $t_{overload(200\%)}$, the gain circuitry unit 14 detects that motor thermal load has exceeded the predetermined lower limit and gradually reduces the gain output to multiplier 32 to less than '1' according to the predetermined relationship between motor thermal load and gain. Accordingly, the control module 16 limits the power in motor 30, thus stabilising the motor thermal load and the motor power at the rated point. When the system load decreases and motor thermal load reduces, the gain circuitry unit 14 increases the gain (up to '1' if possible), so that greater power can once again be delivered to the motor 30 when required.

Similarly, an overload current of X % (between 100% and 200%) can be supplied for a longer time $t_{overload(X\%)}$ before gain circuitry unit 14 detects that the motor thermal load has exceeded the predetermined limit and the gain is reduced.

Figure 1:
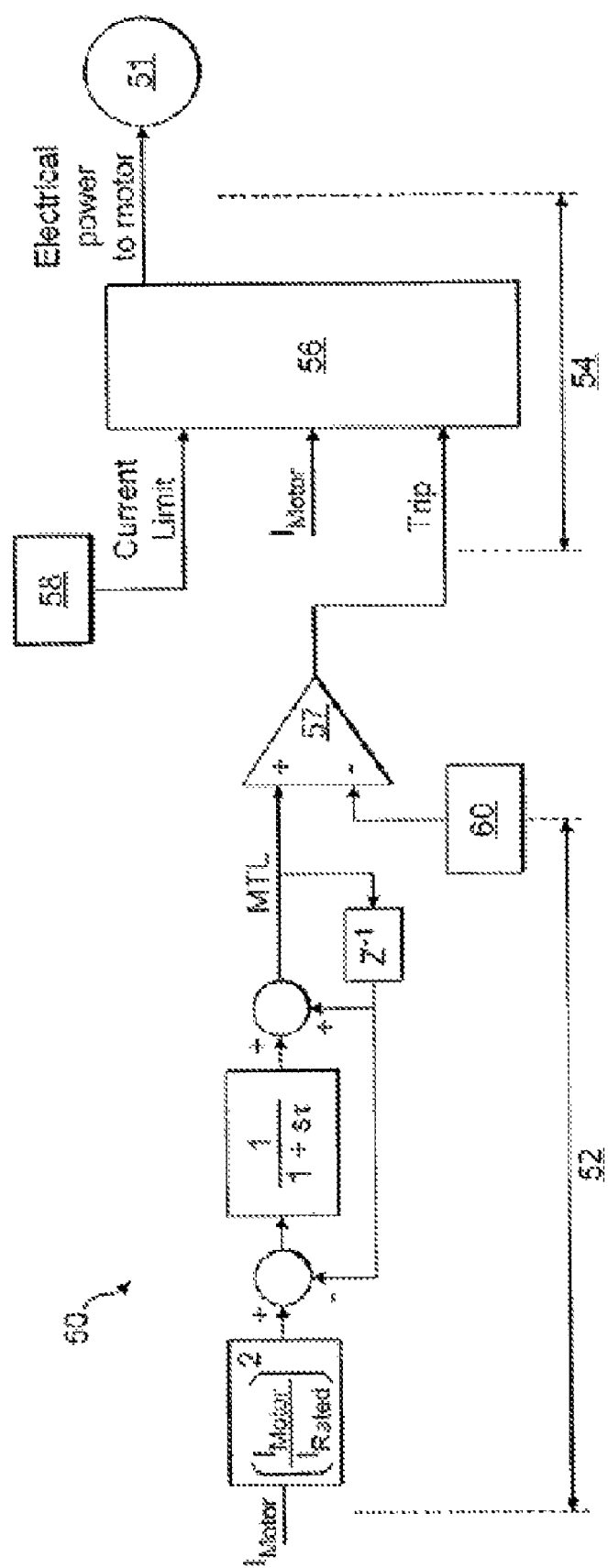
FIG. 1 shows a known arrangement of a drive control in a pumping system.
Figure 5:
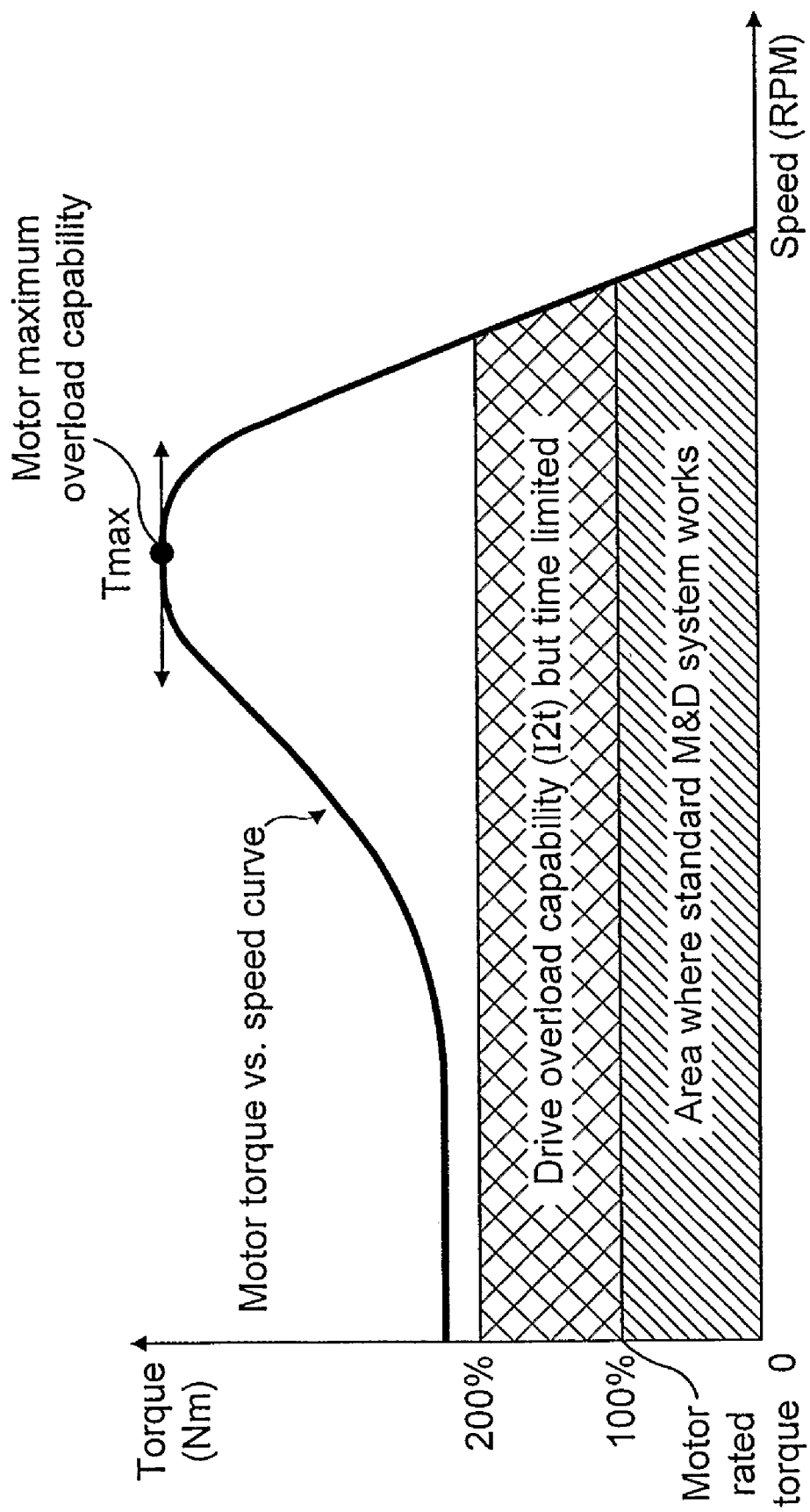
FIG. 5 shows a graph of torque against speed of a motor, comparing the motor performance of a conventional system with an arrangement according to the embodiment of the present invention.

FIG. 5 shows a graph of Torque (Nm) against Motor Speed (RPM) for illustrating the benefit of the embodiment. A motor torque against rotational speed curve is plotted and the maximum overload torque Tmax is indicated. It will be seen that the motor rated torque, at which the motor can be operated indefinitely without damage, is considerably less than Tmax. The prior art drive control shown in FIG. 1 is confined to operating the motor in the area below the drive rated torque, otherwise there is a risk that the motor will be tripped. Drive 8 can, however, improve system performance by causing the motor to operate in, for instance, the area below the line indicating 200% torque and thus benefit from increased torque and power, without risk of damage or system tripping. The drive 8 causes, or intentionally forces, the motor to operate in overload when the load on the motor requires increased power supply to the motor, for instance, during pump-down of a vacuum chamber.

Although a gain circuitry unit 14 has been shown for adjusting the amount of power which can be delivered to the motor, any suitable means can be used depending on the specific requirements of the motor, drive and/or pump.

In the embodiment, motor thermal load is used to select the appropriate gain output. Accordingly, the embodiment allows operation of the motor in an overload condition without the motor overheating and without the motor tripping. However, in addition to or in place of motor thermal load, the invention contemplates operation of the pumping system to prevent other states of the drive, motor or pump (such as voltage, current, power, frequency or impedance) from exceeding their respective operational limits. In particular, the variable speed drive itself can be operated in overload (typically up to 200% of rated power), and can be protected by determining Drive Thermal Load (DTL) in a similar way to Motor Thermal Load (MTL) described in detail hereinabove.

The first embodiment adopts a so-called 'indirect' arrangement by using the measured motor current to determine motor thermal load and thus the motor temperature. Alternatively, however, the drive control can work on a 'direct' arrangement by using feedback from sensors embedded within the pump system, such as direct measurement of motor winding temperature, pump body temperature, exhaust pressure, gas temperature, foreline pressure and so on.

Figure 6:
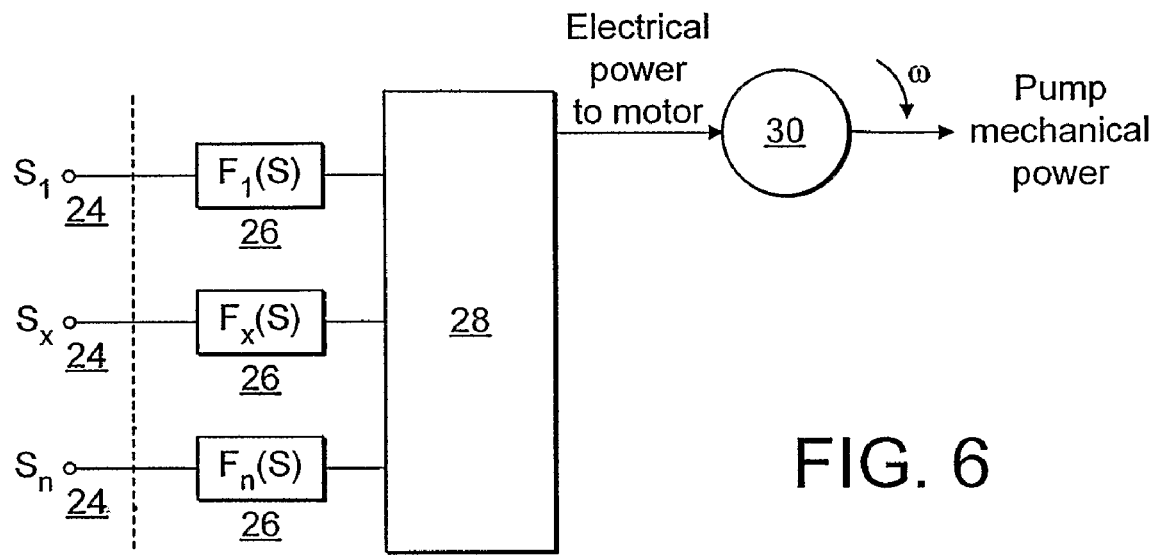
FIG. 6 illustrates a second embodiment of the invention.
Figure 7:
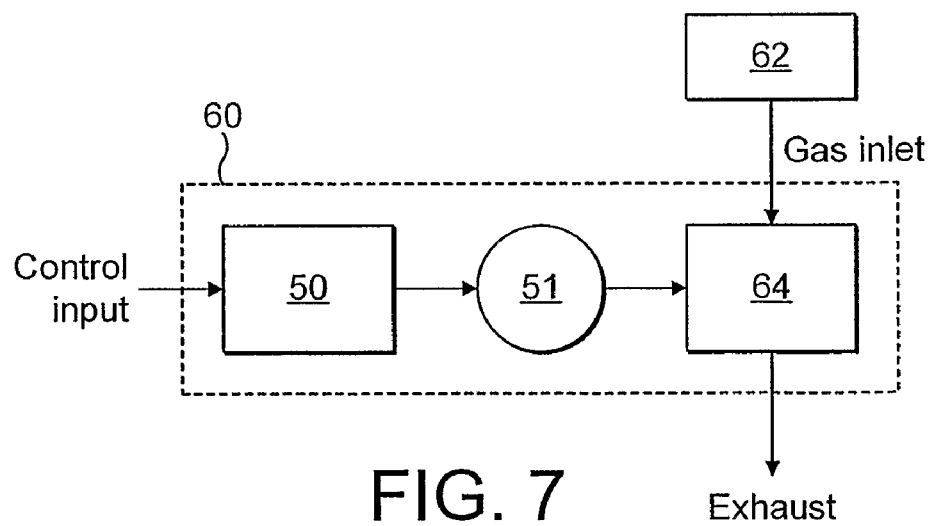
FIG. 7 is schematic diagram of a pumping system.

FIG. 6 shows a second embodiment in which such a direct arrangement is adopted. The arrangement determines an internal state of the pumping system and controls motor power to prevent that state from exceeding a predetermined operational limit. For example, the temperature of the pumping mechanism may be monitored by a sensor located within the pump to prevent the mechanism from over-heating. The sensed state is used to adjust the current limit and hence motor power, and thereby prevent the pumping mechanism from over-heating.

FIG. 6 shows a drive control in the form of a variable speed drive 28 for delivering electrical power to a motor 30 for driving a pumping mechanism of a pump, particularly a vacuum pump. Drive 28 is similar to drive 8 except that one or more conditioners 26 are provided for determining sensor information from one or more respective sensors 24 in the pumping system. Data from the sensors 24 are fed through respective conditioners 26, which convert the data to information understandable to the drive 28. The sensors 24 monitor internal states within the pump (such as pump body temperature, exhaust pressure or motor winding temperature). The conditioned sensor information is input to gain circuitry, or other suitable adjustment means, where a gain is determined for limiting the motor power 30.

In arrangements incorporating multiple sensor inputs, an indicator may provide a warning to the user indicating which of the sensors is causing the power output to be controlled. This information can be used to provide advance warning of a developing problem that, in the prior art, would have resulted in a system trip.

The above illustrated embodiments allow a drive control and motor to be chosen that causes operation in an overload condition for transient periods, for example, during pump-down, and therefore a less expensive motor/drive assembly can be selected for specific pumping requirements than would be the case for prior art motor/drive assemblies. Furthermore, increased torque, as shown in FIG. 5 permits higher starting torque and better dirt crunching capability. A comparison of the first embodiment with a prior art motor/drive for a selected commercially available vacuum pump is included below in Table 1.

TABLE I

| performance measure | Vacuum Pump X (prior art) | Vacuum Pump X (with embodiment) | Improvement |
|---|---|---|---|
| starting torque | 5 Nm | 8 Nm | 60% |
| pump down 10 L | 8.4 s | 3.5 s | 58% |
| pump down 50 L | 32.9 s | 25.2 s | 23% |

In the above example it will be seen that significant improvements in performance are realised.

In the embodiments described above, the drive control takes the form of a digital variable speed drive. However, the drive control may include one or more analogue means, such as an analogue circuit, for determining a state within the system and controlling motor power.

It may be desirable that the drive control is operable to prevent said system from operating in an overload condition. Switching means may therefore be provided to switch the drive control between operation according to the present invention and operation as described with reference to the prior art above. Such an arrangement is useful if it is undesirable for the system to operate in an overload condition in certain applications.

In summary, it will be appreciated that, in all of the above embodiments and modifications described above, instead of cutting the power to the motor to zero when a system state exceeds an operational limit (i.e. tripping), the drive control controls the power so that it is gradually decreased until sustainable operation is reached. Thus, the embodiments cause a motor or a pump system (motor or variable speed drive or pump mechanism) to be run at overcapacity (for example during pump-down) without causing the pump to trip, and hence cease operation.

It is to be appreciated that the above described embodiments are for example only, and that other modifications are within the scope of the appended claims.

While the foregoing description and drawings represent the preferred embodiments of the present invention, it will be apparent to those skilled in the art that various changes and modifications may be made therein without departing from the true spirit and scope of the present invention.

We claim:

1. A pumping system comprising:
   a pumping mechanism;
   a motor for driving the pumping mechanism;
   a drive control for controlling the motor; and
   means for monitoring at least one state within the system;
   wherein the drive control causes the system to operate for transient periods in an overload condition and to control the power to the motor when the system is operating in said overload condition dependent on the level of said monitored state so as to avoid said state from exceeding said operational limit,
   wherein said drive control includes gain circuitry which can adopt: a gain of 1 thereby not limiting motor power; a gain of zero thereby limiting motor power to zero; and any gain between one and zero, said gain circuitry controlling said gain according to a predetermined relationship with said state.

2. The system according to claim 1 wherein the performance is improved by said drive control increasing the power supplied to the motor to a level which can result in said monitored state exceeding a predetermined operational limit.

3. The system according to claim 1 wherein the drive control causes the system to operate in an overload condition when a load on the motor requires increased power supply to the motor.

4. The system according to claim 1 wherein the drive control does not limit said power unless said state exceeds a predetermined lower limit.

5. The system according to claim 4 wherein above said predetermined lower limit, said drive control gradually varies power dependent on said monitored state.

6. The system according to claim 1 wherein the drive control controls the power of the motor by limiting the current supplied to the motor by adjusting the voltage supplied to the motor.

7. The system according to claim 6 wherein the drive control comprises programmable means for setting a maximum allowable current in said motor so as to set the extent to which the system can be overloaded.

8. The system according to claim 1 wherein said state is a temperature within the system.

9. The system according to claim 1 wherein said state is a function of the thermal load of the motor or drive or the pumping mechanism.

10. The system according to claim 9 wherein the drive control estimates the motor thermal load according to:

$$\left(\frac{I_{Motor}}{I_{Rated}}\right)^2 \times \frac{1}{1+s\tau}$$

where:
$I_{motor}$ is the current in the motor;
$I_{rated}$ is a rated current above which said motor is operating in said overload condition;
$\tau$ is a time constant; and
s is the Laplace operator.

11. The system according to claim 1 wherein said monitored state within the system is selected from the group of parameters comprising a pressure, a current, a voltage, an impedance, or a temperature.

12. The system according to claim 1 wherein the drive control comprises means for receiving input from a sensor for monitoring the at least one state within the system, and when the drive control causes the system to operate for transient periods in an overload condition, the power to the motor is controlled to avoid the at least one state from exceeding the predetermined operational limit.

13. The system according to claim 12 wherein the sensor is for sensing a parameter selected from the group comprising gas pressure, temperature, voltage, or impedance within the system.

14. The system according to claim 1 wherein the drive control comprises a variable speed drive for controlling the power to the motor dependent on the level of said monitored state thereby avoiding said state from exceeding said operational limit.

15. The system according to claim 1 wherein the drive control comprises analogue means for controlling the power to the motor dependent on the level of said monitored state thereby avoiding said state from exceeding said operational limit.

16. The system according to claim 1 wherein the drive control is operable to prevent said system from operating in an overload condition.

17. The system according to claim 1 wherein said pumping mechanism is a vacuum pumping mechanism.

* * * * *